(12) United States Patent
Cho

(10) Patent No.: US 10,109,881 B2
(45) Date of Patent: Oct. 23, 2018

(54) SECONDARY BATTERY AND METHOD OF MANUFACTURING THE SAME

(71) Applicant: Samsung SDI Co., Ltd., Yongin-si, Gyeonggi-do (KR)

(72) Inventor: Gibong Cho, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 280 days.

(21) Appl. No.: 14/746,085

(22) Filed: Jun. 22, 2015

(65) Prior Publication Data
US 2016/0049683 A1    Feb. 18, 2016

(30) Foreign Application Priority Data

Aug. 18, 2014    (KR) .................... 10-2014-0106957

(51) Int. Cl.
| | |
|---|---|
| *H01M 10/04* | (2006.01) |
| *H01M 10/0587* | (2010.01) |
| *H01M 2/26* | (2006.01) |
| *H01M 2/36* | (2006.01) |
| *H01M 2/30* | (2006.01) |
| *H01M 4/66* | (2006.01) |

(52) U.S. Cl.
CPC ....... *H01M 10/0431* (2013.01); *H01M 2/263* (2013.01); *H01M 2/30* (2013.01);
(Continued)

(58) Field of Classification Search
CPC ........ H01M 2/263; H01M 2/30; H01M 2/361; H01M 10/043; H01M 10/0422;
(Continued)

(56) References Cited

U.S. PATENT DOCUMENTS

| | | | |
|---|---|---|---|
| 2008/0131768 A1 | 6/2008 | Lee | |
| 2010/0216001 A1* | 8/2010 | Byun | .................... H01M 2/263 |
| | | | 429/94 |

(Continued)

FOREIGN PATENT DOCUMENTS

| | | | |
|---|---|---|---|
| JP | 2000200594 A | * | 7/2000 |
| KR | 10-2004-0024780 A | | 3/2004 |

(Continued)

OTHER PUBLICATIONS

Machine translation of JP 2000-200594, relied upon in the rejection (Year: 2000).*

*Primary Examiner* — Eugenia Wang
(74) *Attorney, Agent, or Firm* — Knobbe Martens Olson & Bear LLP

(57) ABSTRACT

A secondary battery and method of manufacturing the same are disclosed. In one aspect, the secondary battery includes an electrode assembly including a first current collector, a second current collector, and an isolation layer interposed between the first and second current collectors, the first current collector, the second current collector, and the isolation layer being wound, each of the first and second current collectors including a body portion and an extension portion extending from the body portion, and the extension portions of the first and second current collectors extending in substantially opposite directions. The battery also includes a first auxiliary current collector formed over the electrode assembly and electrically connected to the extension portion of the first current collector. The battery further includes a second auxiliary current collector formed below the electrode assembly and electrically connected to the extension portion of the second current collector.

13 Claims, 7 Drawing Sheets

(52) U.S. Cl.
CPC ....... *H01M 2/361* (2013.01); *H01M 10/0587* (2013.01); *H01M 4/667* (2013.01); *H01M 10/0422* (2013.01)

(58) Field of Classification Search
CPC ............. H01M 10/0587; H01M 2/022; H01M 2/0225; H01M 2/0227; H01M 2/023; H01M 10/0431; H01M 4/667
See application file for complete search history.

(56) References Cited

U.S. PATENT DOCUMENTS

| | | | |
|---|---|---|---|
| 2011/0008661 A1* | 1/2011 | Kozuki | H01M 2/26 429/94 |
| 2011/0064995 A1* | 3/2011 | Kim | H01M 2/08 429/174 |
| 2011/0300436 A1 | 12/2011 | Lee et al. | |
| 2012/0015278 A1 | 1/2012 | Yoon et al. | |
| 2012/0070721 A1* | 3/2012 | Han | H01M 2/0413 429/163 |

FOREIGN PATENT DOCUMENTS

| | | |
|---|---|---|
| KR | 10-2004-0092531 A | 11/2004 |
| KR | 10-2005-0052220 A | 6/2005 |
| KR | 10-2006-0022360 A | 3/2006 |
| KR | 10-2008-0047165 A | 5/2008 |
| KR | 10-2008-0049547 A | 6/2008 |
| KR | 10-2011-0134010 A | 12/2011 |
| KR | 10-2012-0008273 A | 1/2012 |

* cited by examiner

SECONDARY BATTERY AND METHOD OF MANUFACTURING THE SAME

RELATED APPLICATION

This application claims the benefit of Korean Patent Application No. 10-2014-0106957, filed on Aug. 18, 2014, in the Korean Intellectual Property Office, the disclosure of which is incorporated herein in its entirety by reference.

BACKGROUND

Field

The described technology generally relates to a secondary battery and a method of manufacturing the secondary battery.

Description of the Related Technology

In general, secondary batteries are rechargeable, unlike primary batteries. They are used in advanced electronic devices such as mobile devices, laptop computers, and camcorders. In particular, lithium secondary batteries have a higher operating voltage and higher energy density per unit weight than typical secondary batteries such as nickel-cadmium batteries or nickel-hydrogen batteries. However, it is not easy to manufacture lithium secondary batteries and the manufacturing yield thereof is low.

SUMMARY OF CERTAIN INVENTIVE ASPECTS

One inventive aspect is a secondary battery that can be easily manufactured with high manufacturing yield.

Another aspect is a method of manufacturing the secondary battery.

Another aspect is a secondary battery that includes: an electrode assembly including a first current collector, a second current collector, and an isolation layer interposed between the first current collector and the second current collector, wherein the first current collector, the second current collector, and the isolation layer are wound, and a first part of the first current collector protrudes upward and a second part of the second current collector protrudes downward; a first auxiliary current collector disposed on an upper portion of the electrode assembly and electrically connected to the first part of the first current collector; and a second auxiliary current collector disposed on a lower portion of the electrode assembly and electrically connected to the second part of the second current collector.

The secondary battery can further include: a first insulating layer disposed between a surface of the first auxiliary current collector which faces the electrode assembly and the electrode assembly; and a second insulating layer disposed between a surface of the second auxiliary current collector which faces the electrode assembly and the electrode assembly.

The first insulating layer can be a first coating layer that covers the surface of the first auxiliary current collector, which faces the electrode assembly. The first auxiliary current collector can include an electrode terminal located on a surface that faces a direction opposite to the electrode assembly, and the first coating layer can cover the first auxiliary current collector except for at least the electrode terminal.

The second insulating layer can be a second coating layer that covers the surface of the second auxiliary current collector which faces the electrode assembly.

The electrode assembly can include a winding hole extending in a vertical direction in a center portion thereof, and the first auxiliary current collector can include a central through hole corresponding to the winding hole. The second auxiliary current collector can have a knurling corresponding to the winding hole on a surface that faces a direction opposite the electrode assembly.

The first auxiliary current collector can include a plurality of first injection through holes. The second auxiliary current collector can include a plurality of second injection through holes.

The secondary battery can further include: a first active material layer disposed on the first current collector except for the first part; and a second active material layer disposed on the second current collector except for the second part.

The first auxiliary current collector can include a first groove in which the first part of the first current collector is inserted, and the second auxiliary current collector can include a second groove in which the second part of the second current collector is inserted.

Another aspect is a method of manufacturing a secondary battery. The method includes: preparing a first current collector extending in a first direction and including a first part protruding in a second direction that crosses the first direction; preparing a second current collector extending in the first direction and including a second part protruding in an opposite direction to the second direction; forming an electrode assembly by overlapping the first current collector and the second current collector with an isolation layer interposed between the first current collector and the second current collector, and winding the first current collector, the isolation layer, and the second current collector based on the second direction; coupling the electrode assembly and a first auxiliary current collector to each other by electrically connecting the first auxiliary current collector and the first part, from the second direction of the electrode assembly; and coupling the electrode assembly and a second auxiliary current collector to each other by electrically connecting the second auxiliary current collector and the second part, from an opposite direction to the second direction of the electrode assembly.

In the coupling of the first auxiliary current collector, the first auxiliary current collector can be coupled to the electrode assembly so that a surface of the first auxiliary current collector, which is covered by a first coating layer that is an insulating layer, faces the electrode assembly.

The first auxiliary current collector can include an electrode terminal on a surface thereof, the first coating layer covers the first auxiliary current collector except for the electrode terminal, and the first auxiliary current collector can be coupled to the electrode assembly so that the electrode terminal can be located opposite to the electrode assembly.

In the coupling of the second auxiliary current collector, the second auxiliary current collector can be coupled to the electrode assembly so that a surface of the second auxiliary current collector, which is covered by a second coating layer that is an insulating layer, faces the electrode assembly.

The forming of the electrode assembly can include: disposing a winding core to extend in the second direction; winding the first current collector, the isolation layer, and the second current collector based on the winding core; and removing the winding core to form the electrode assembly having a winding hole extending in an up-and-down direction on a center portion thereof.

In the coupling of the second auxiliary current collector, the electrode assembly and the second auxiliary current collector can be coupled to each other so that a knurling formed on a surface of the second auxiliary current collector which is opposite to the second direction corresponds to the winding hole.

The first auxiliary current collector can include a plurality of first injection through holes. The second auxiliary current collector can include a plurality of second injection through holes.

In the preparing of the first current collector, a first active material layer can be disposed on the first current collector except for the first part, and in the preparing of the second current collector, a second active material layer can be disposed on the second current collector except for the second part.

Another aspect is a secondary battery comprising an electrode assembly including a first current collector, a second current collector, and an isolation layer interposed between the first and second current collectors, wherein the first current collector, the second current collector, and the isolation layer are wound, wherein each of the first and second current collectors includes a body portion and an extension portion extending from the body portion, wherein the extension portions of the first and second current collectors extend in substantially opposite directions. The battery also comprises a first auxiliary current collector formed over the electrode assembly and electrically connected to the extension portion of the first current collector. The battery further comprises a second auxiliary current collector formed below the electrode assembly and electrically connected to the extension portion of the second current collector.

The above secondary battery further comprises a first insulating layer formed between a surface of the first auxiliary current collector which faces the electrode assembly and the electrode assembly. The above secondary battery further comprises a second insulating layer formed between a surface of the second auxiliary current collector which faces the electrode assembly and the electrode assembly.

In the above secondary battery, the first insulating layer includes a first coating layer substantially covering the surface of the first auxiliary current collector.

In the above secondary battery, the first auxiliary current collector comprises an electrode terminal formed on a surface that faces a direction opposite to the electrode assembly, wherein the first coating layer substantially covers the first auxiliary current collector except for at least the electrode terminal.

In the above secondary battery, the second insulating layer includes a second coating layer substantially covering the surface of the second auxiliary current collector facing the electrode assembly.

In the above secondary battery, the electrode assembly has a winding hole extending in a substantially vertical direction in a center portion thereof, wherein the first auxiliary current collector comprises a central through hole corresponding to the winding hole.

In the above secondary battery, the second auxiliary current collector includes a knurling corresponding to the winding hole, on a surface that faces a direction opposite to the electrode assembly.

In the above secondary battery, the first auxiliary current collector has a plurality of first injection through holes.

In the above secondary battery, the second auxiliary current collector has a plurality of second injection through holes.

The above secondary battery further comprises a first active material layer formed on the body portion of the first current collector and a second active material layer formed on the body portion of the second current collector, In the above secondary battery, the first auxiliary current collector has a first groove configured to receive the extension portion of the first current collector, and the second auxiliary current collector has a second groove configured to receive the extension portion of the second current collector.

Another aspect is a method of manufacturing a secondary battery, the method comprising preparing a first current collector including a first body portion that extends in a first direction and a first extension portion that extends from the first body portion in a second direction crossing the first direction. The method also comprises preparing a second current collector including a second body portion that extends in the first direction and a second extension portion that extends from the second body portion in a third direction substantially opposite to the second direction. The method also comprises forming an electrode assembly by overlapping the first and second current collectors with an isolation layer interposed therebetween and winding the first current collector, the isolation layer, and the second current collector around an axis in the second direction. The method also comprises first electrically connecting a first auxiliary current collector to the first extension portion so as to electrically connect the electrode assembly to the first auxiliary current collector in the second direction. The method also comprises second electrically connecting a second auxiliary current collector to the second extension portion so as to electrically connect the electrode assembly and the second auxiliary current collector to each other in the third direction.

In the above method, the first electrically connecting comprises coupling the first auxiliary current collector to the electrode assembly so that a surface of the first auxiliary current collector, which is substantially covered by a first coating layer that is an insulating layer, faces the electrode assembly.

In the above method, the first auxiliary current collector comprises an electrode terminal on a surface thereof, wherein the first coating layer substantially covers the first auxiliary current collector except for the electrode terminal, and wherein the first auxiliary current collector is coupled to the electrode assembly so that the electrode terminal is located substantially opposite to the electrode assembly.

In the above method, the second electrically connecting comprises coupling the second auxiliary current collector to the electrode assembly so that a surface of the second auxiliary current collector, which is covered by a second coating layer that is an insulating layer, faces the electrode assembly.

In the forming of the electrode assembly may comprise disposing a winding core to extend in the second direction, winding the first currently collector, the isolation layer, and the second current collector around the winding core, and removing the winding core so as to form the electrode assembly having a winding hole extending in an up-and-down direction on a center portion thereof.

In the above method, the second electrically connecting comprises coupling the electrode assembly and the second auxiliary current collector to each other so that a knurling formed on a surface of the second auxiliary current collector corresponds to the winding hole.

In the above method, the first auxiliary current collector has a plurality of first injection through holes.

In the above method, the second auxiliary current collector has a plurality of second injection through holes.

In the above method, in the preparing of the first current collector, a first active material layer is formed on the first body portion of the first current collector, wherein, in the preparing of the second current collector, a second active material layer is formed on the second body portion of the second current collector.

DETAILED DESCRIPTION OF CERTAIN INVENTIVE EMBODIMENTS

Figure 1:
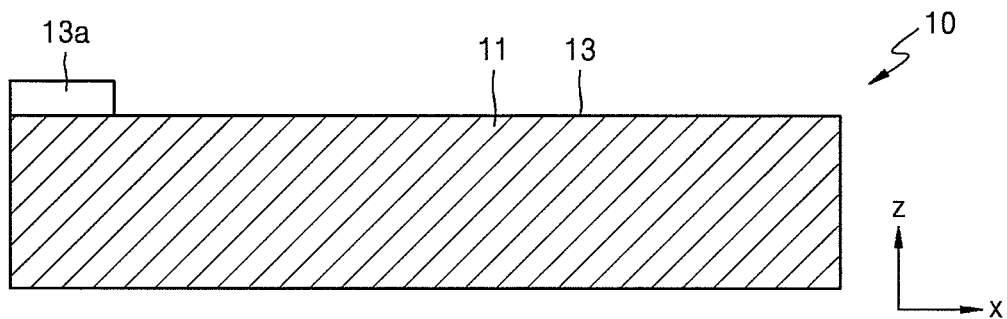
FIGS. 1 through 4 are schematic diagrams illustrating processes of manufacturing a secondary battery according to an embodiment.

As the described technology allows for various changes and numerous embodiments, particular embodiments will be illustrated in the drawings and described in the written description. However, this is not intended to limit the described technology to particular modes of practice, and it is to be appreciated that all changes, equivalents, and substitutes that do not depart from the spirit and technical scope of the described technology are encompassed in the described technology.

Hereinafter, the described technology will be described by explaining certain embodiments with reference to the attached drawings. Like reference numerals in the drawings denote like elements.

It will be understood that when a layer, region, or component is referred to as being "formed on" another layer, region, or component, it can be directly or indirectly formed on the other layer, region, or component. That is, for example, intervening layers, regions, or components can be present. Sizes of components in the drawings can be exaggerated for convenience of explanation. In other words, since sizes and thicknesses of components in the drawings are arbitrarily illustrated for convenience of explanation, the following embodiments are not limited thereto.

In the following examples, the x-axis, the y-axis, and the z-axis are not limited to three axes of a rectangular coordinate system and can be interpreted in a broader sense. For example, the x-axis, the y-axis, and the z-axis can be perpendicular to one another, or can represent different directions that are not perpendicular to one another.

As used herein, the term "and/or" includes any and all combinations of one or more of the associated listed items. In this disclosure, the term "substantially" includes the meanings of completely, almost completely or to any significant degree under some applications and in accordance with those skilled in the art. Moreover, "formed on" can also mean "formed over." The term "connected" can include an electrical connection.

FIGS. 1 through 4 are schematic diagrams illustrating processes of manufacturing a secondary battery, according to an embodiment.

As shown in FIG. 1, a first current collector 10 is prepared. The first current collector 10 includes a first electrode plate 13 extending in a first direction (+x direction) and having a first part or an extension portion or a first extension portion 13a protruding in a second direction (+z direction) crossing the first direction (+x direction). A surface of the first electrode plate 13 or opposite surfaces of the first electrode plate 13 can be coated with a first active material 11. In some embodiments, the first active material 11 is not coated on the first part 13a of the first electrode plate 13. If the first current collector 10 is a cathode current collector, the first electrode plate 13 can be formed of aluminum. In this case, the first active material 11 can be a cathode active material, and the cathode active material can include, for example, lithium-based oxide.

The first current collector 10 shown in FIG. 1 can be prepared in various ways. For example, the first electrode plate 13 of a rectangular shape is prepared on a xz plane extending in the first direction (+x direction), and the first active material 11 is coated on the first electrode plate 13 except for an edge side (in +z direction). After that, except for a portion of the edge side in a direction substantially opposite to the first direction, other portions of the edge side are removed to form an end portion protruding in the second direction (+z direction). The other portions of the edge side can be removed by using a laser ablation technique (LAT) or a pressing technology.

Figure 2:
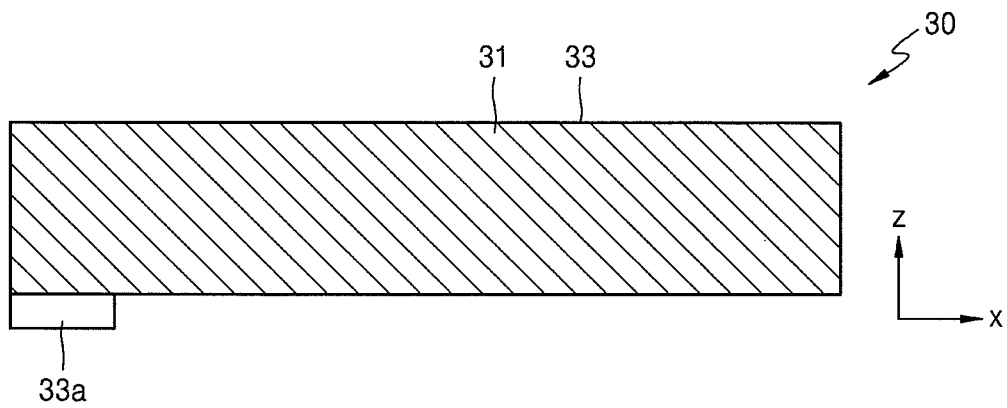

In addition, as shown in FIG. 2, a second current collector 30 is prepared. The second current collector 30 includes a second electrode plate 33 extending in the first direction (+x direction) and having a second part or an extension portion or a second extension portion 33a protruding or extending in an opposite direction (−z direction) to the second direction (+z direction) crossing the first direction (+x direction). A second active material 31 can be coated on a surface or opposite surfaces of the second electrode plate 33. In some embodiments, the second active material 31 is not coated on the second part 33a of the second electrode plate 33. If the second current collector 30 is an anode current collector, the second electrode plate 33 can be formed of copper. In this case, the second active material 31 is an anode active material, and the anode active material includes, for example, a carbon material.

The second current collector 30 shown in FIG. 2 can be prepared in various ways. For example, the second electrode plate 33 of a substantially rectangular shape extending in the first direction (+x direction) (on the xz plane) is prepared, and the second electrode plate 33 is coated with the second active material 31 except for an edge side (in −z direction) of the second electrode plate 33. After that, except for a portion of the edge side in a direction substantially opposite to the first direction, other portions of the edge side are removed to form an end portion protruding in an opposite direction (−z direction) to the second direction (+z direction). The other portions of the edge side can be removed by using a laser ablation technique (LAT) or a pressing technology.

The second current collector 30 can be prepared after preparing the first current collector 10, the first current collector 10 can be prepared after preparing the second current collector 30, or the first current collector 10 and the second current collector 30 can be prepared substantially simultaneously.

Figure 3:
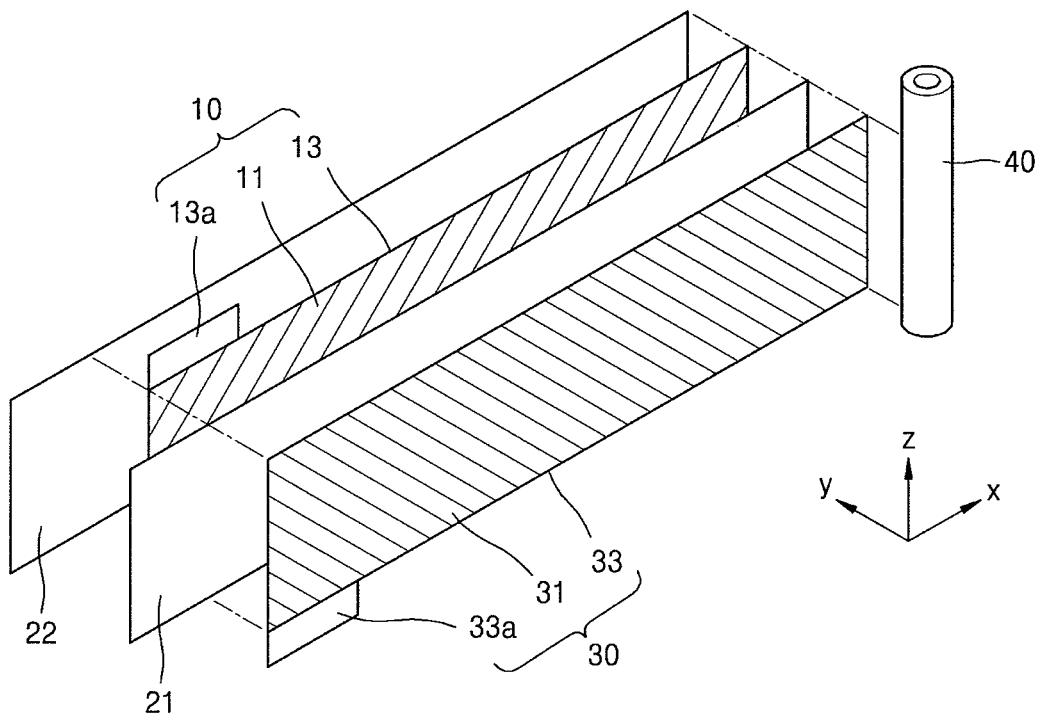

After preparing the first and second current collectors 10 and 30, an electrode assembly is formed in a jelly-role shape. For example, as shown in FIG. 3, the first and second current collectors 10 and 30 at least partially overlap each other with an isolation layer 21 interposed between the first current collector 10 and the second current collector 30 (in the +y direction), and then the first current collector 10, the isolation layer 21, and the second current collector 30 are wound about the second direction (+z direction) by using a winding core 40 that extends in the second direction (+z direction). Then, the winding core 40 is removed so that the electrode assembly having a winding hole 40a that extends in a substantially vertical direction (z axis direction) is formed.

Figure 4:
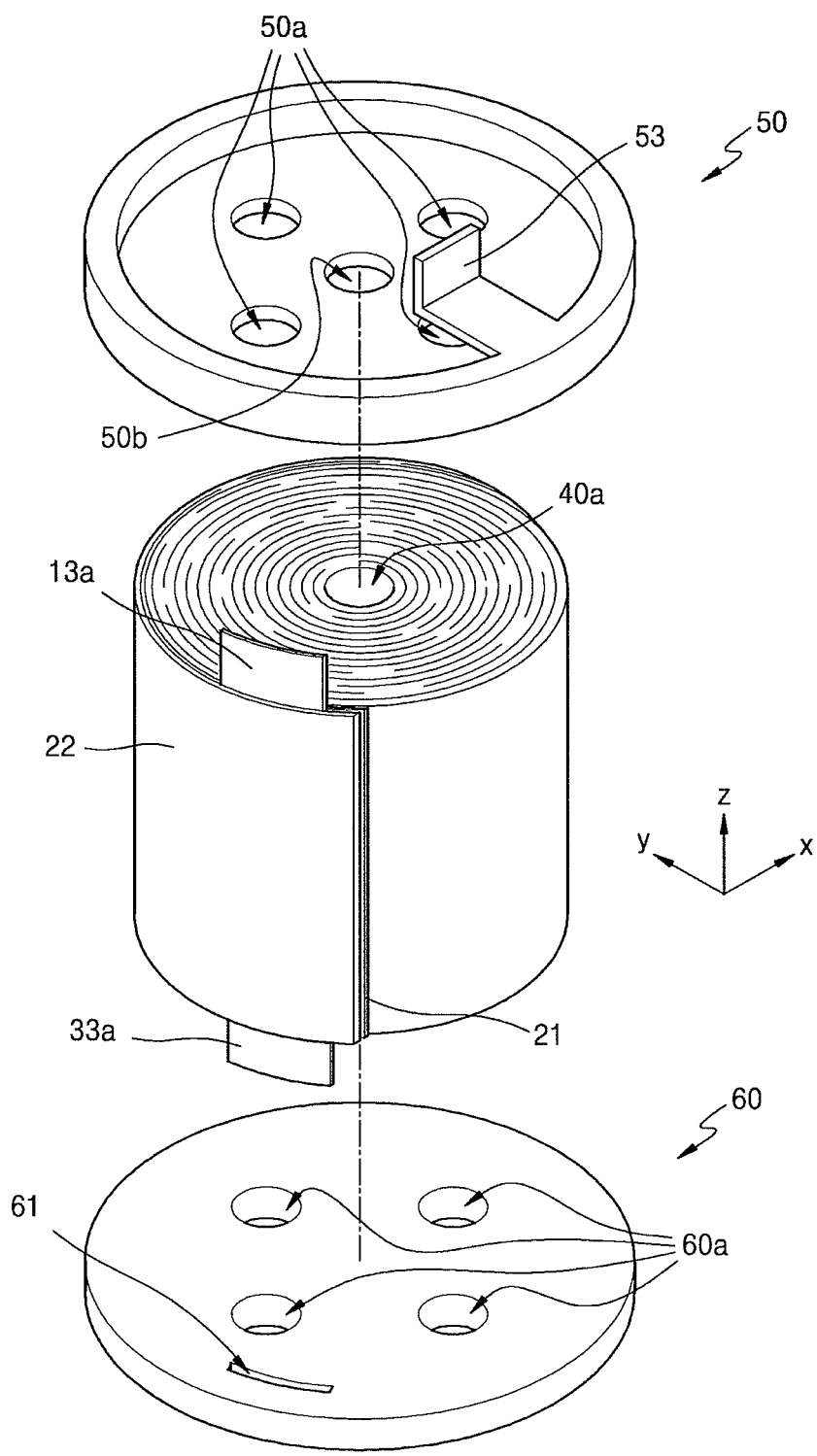

In some embodiments, the isolation layer 21 is formed i) between the first and second current collectors 10 and 30 as shown in FIG. 3, and ii) on an outer side of the first current collector 10 in a direction (+y direction) substantially opposite to a direction of the second current collector 30 (−y direction). In this state, the isolation layer 22, the first current collector 10, the isolation layer 21, and the second current collector 30 are wound to form the electrode assembly shown in FIG. 4. Thus, in some embodiments, the first and second current collectors 10 and 30 do not directly contact each other. In addition, as shown in FIG. 4, since the isolation layer 22 is located at the outermost portion of the electrode assembly, the first current collector 10 and/or the second current collector 30 are not exposed to the environment.

As shown in FIG. 3, an extension length of the isolation layer 21 and/or the isolation layer 22 in the first direction (+x direction) are longer than that of the first and second current collectors 10 and 30 in the first direction (+x direction). As such, the isolation layer 21 can prevent the first and second current collectors 10 and 30 from directly contacting each other. In some embodiments, the first current collector 10 and/or the second current collector 30 are not exposed at the outermost portion of the electrode assembly, and only the isolation layer 22 is exposed. For example, to have only the isolation layer 22 exposed, the isolation layer 22 protrudes out of the first current collector 10 in the direction (−x direction) opposite to the direction where the winding core 40 is located (+x direction) when starting the winding operation by using the winding core 40.

Thereafter, a first auxiliary current collector 50 is coupled to the electrode assembly, and then, a second auxiliary current collector 60 is coupled to the electrode assembly. The second auxiliary current collector 60 can be coupled to the electrode assembly after coupling the first auxiliary current collector 50 to the electrode assembly, and the first auxiliary current collector 50 can be coupled after coupling the second current collector 60 to the electrode assembly. Alternatively, the first and second auxiliary current collectors 50 and 60 can be substantially simultaneously coupled to the electrode assembly.

When the first auxiliary current collector 50 is coupled to the electrode assembly, the first part 13a is inserted into a first through-hole 51 (see FIG. 6) of the first auxiliary current collector 50 from the second direction (+z direction) so that the electrode assembly and the first auxiliary current collector 50 are coupled. In addition, when coupling the second auxiliary current collector 60 to the electrode assembly, the second part 33a is inserted into a second through-hole 61 of the second auxiliary current collector 60 from an opposite direction (−z direction) of the second direction (+z direction) so that the electrode assembly and the second auxiliary current collector 60 are coupled to each other. As such, the first auxiliary current collector 50 is electrically connected to the first current collector 10, and the second auxiliary current collector 60 is electrically connected to the second current collector 30. In some embodiments, in a state where the first part 13a of the first current collector 10 is inserted, in the first through-hole 51 of the first auxiliary current collector 50, the first part 13a and the first auxiliary current collector 50 are compressed toward each other or welded to each other by laser. In addition, in a state where the second part 33a of the second current collector 30 is inserted in the second through-hole 61 of the second auxiliary current collector 60, the second part 33a and the second auxiliary current collector 60 can be compressed toward each other or welded to each other by laser.

As described above, by inserting the first part 13a in the first through-hole 51 and inserting the second part 33a in the second through-hole 61, an electric connection between the first current collector 10 and the first auxiliary current collector 50 and between the second current collector 30 and the second auxiliary current collector 60 can be ensured.

The first through hole 51 of the first auxiliary current collector 50 can penetrate through the first auxiliary current collector 50. The second through-hole 61 can penetrate the second auxiliary current collector 60.

Figure 5:
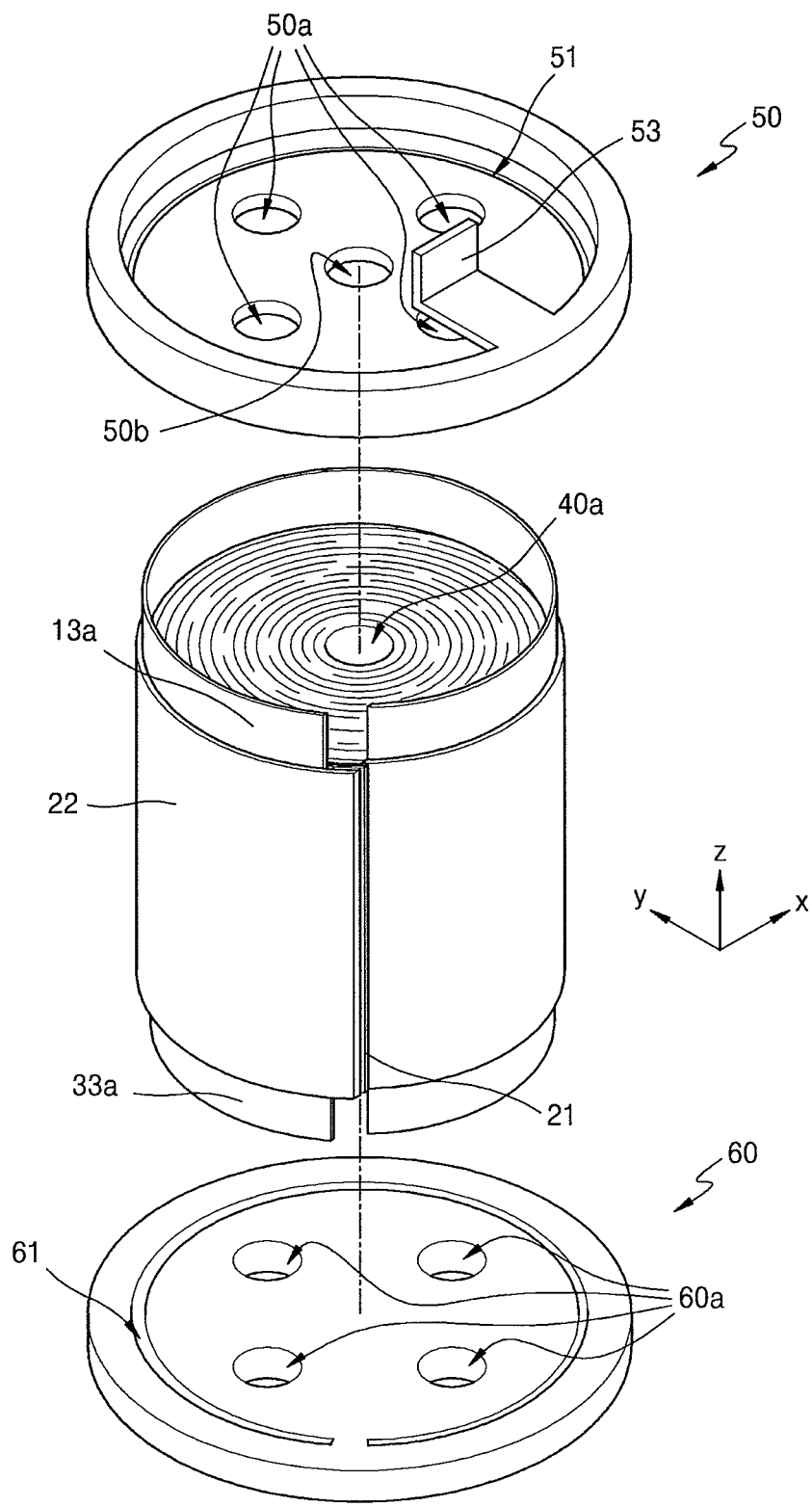
FIG. 5 is a schematic diagram illustrating processes of manufacturing a secondary battery according to another embodiment of a secondary battery.

In FIG. 4, the first part 13a of the first current collector 10 does not correspond to the entire circumference of the electrode assembly. However, as shown in FIG. 5, the size of the first part 13a is adjusted so that the first part 13a corresponds to the entire or substantially the entire circumference of the electrode assembly. Also, in some embodiments, the size of the second part 33a is also adjusted so that the second part 33a corresponds to the entire or substantially the entire circumference of the electrode assembly, as shown in FIG. 5. As such, a contact area between the first part 13a and the first auxiliary current collector 50 and a contact area between the second part 33a and the second auxiliary current collector 60 can increase, thereby improving the performance of the secondary battery.

In addition, at least a bottom surface (in −z direction) of the first auxiliary current collector 50 can be substantially covered by a first coating layer, that is, an insulating layer. Accordingly, when coupling the first auxiliary current collector 50 to the electrode assembly, the first auxiliary current collector 50 and the electrode assembly can be coupled to each other so that the bottom surface of the first auxiliary current collector 50, which is substantially covered by the first coating layer, can face the electrode assembly (located in the −z direction). For example, the first part 13a inserted in the first through-hole 51 is electrically connected only to the first auxiliary current collector 50, and accordingly, only the first auxiliary current collector 50 and the first current collector 10 are electrically connected to each other. In addition, in some embodiments, the first auxiliary current collector 50 and the second current collector 30 are not electrically connected to each other. The first coating layer that is the insulating layer can also be formed on a side surface of the first auxiliary current collector 50 so as to prevent a short-circuit between the first auxiliary current collector 50 and a can 72 (see FIG. 8).

At least an upper surface of the second auxiliary current collector 60 (in the +z direction) can be substantially covered with a second coating layer, that is, an insulating layer. Accordingly, when coupling the second auxiliary current collector 60 to the electrode assembly, the second auxiliary current collector 60 and the electrode assembly can be coupled to each other so that the upper surface of the second auxiliary current collector 60, which is covered by the second coating layer, can face the electrode assembly (located in the +z direction), As such, in some embodiments, only the second part 33a of the second current collector 30, which is inserted in the second through-hole 61 of the second auxiliary current collector 60, is electrically connected to the second auxiliary current collector 60. Furthermore, only the second auxiliary current collector 60 and the second current collector 30 are electrically connected to each other, whereas the second auxiliary current collector 60 and the first current collector 10 are not electrically connected to each other.

Figure 7:
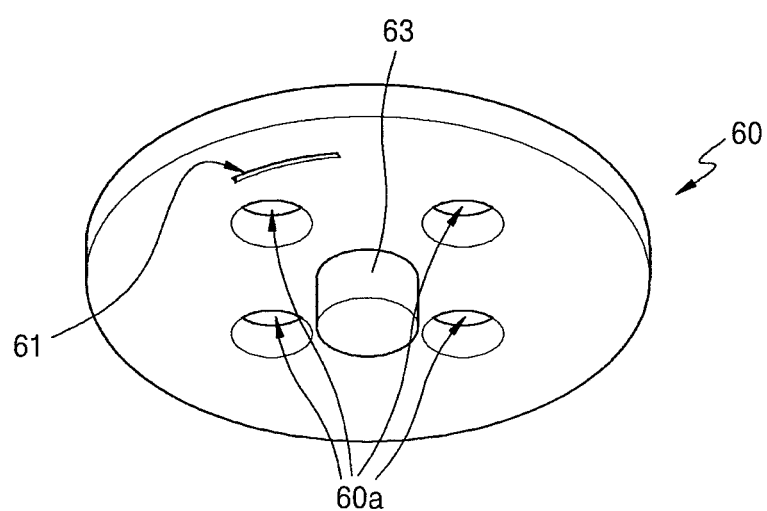
FIG. 7 is a bottom perspective view of a second auxiliary current collector of a secondary battery according to an embodiment.

As described above, since the electrode assembly has the winding hole 40a extending in substantially the vertical direction, the second auxiliary current collector 60 has a knurling 63 as shown in FIG. 7. The knurling 63 is located on a surface between the opposite surfaces of the second auxiliary current collector 60, that is, a direction (−z direction) opposite to the second direction (+z direction) facing the electrode assembly when the second auxiliary current collector 60 is coupled to the electrode assembly. In addition, when the second auxiliary current collector 60 is coupled to the electrode assembly, the knurling 63 corresponds to the winding hole 40a.

Figure 8:
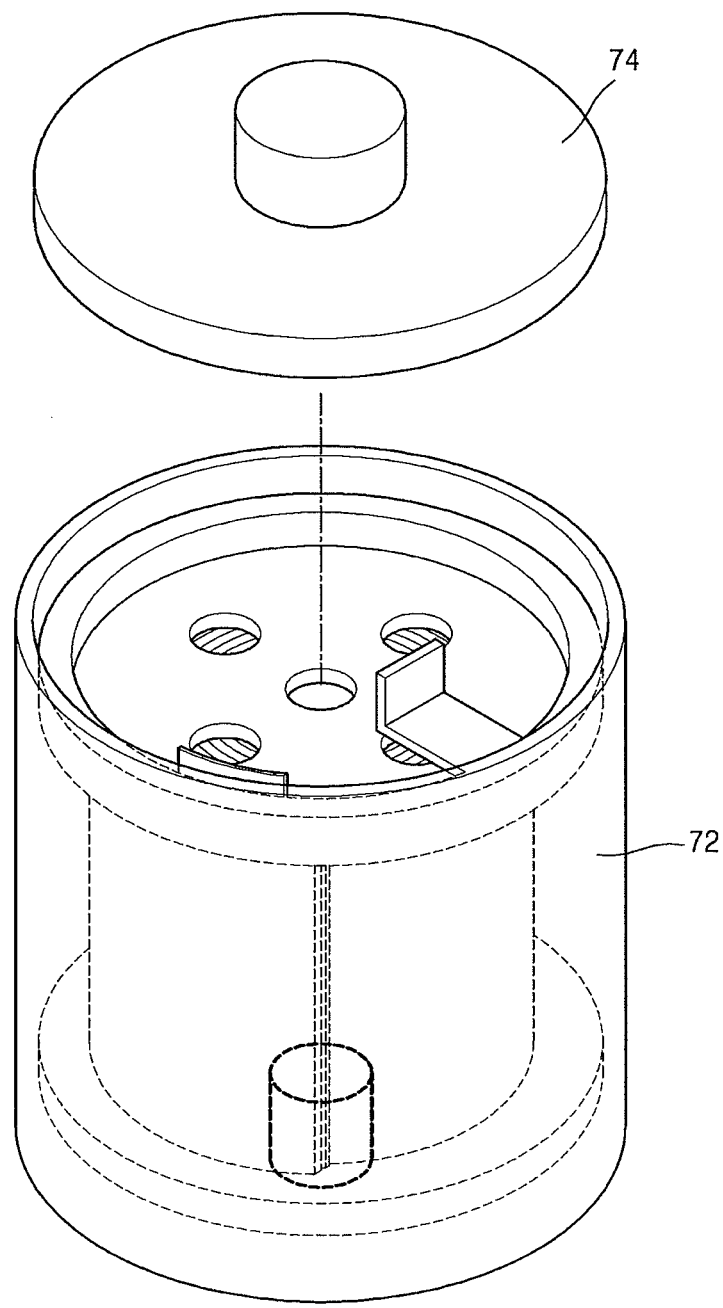
FIG. 8 is an exploded perspective view of a secondary battery according to an embodiment.

Referring to FIG. 8, the first auxiliary current collector 50, the electrode assembly, and the second auxiliary current collector 60 are coupled to each other. Then, they can be inserted into the can 72 having an open upper portion (in the +z direction) as shown in FIG. 8. In this case, a welding rod can be inserted into the winding hole 40a so that an end portion of the welding rod can contact the second auxiliary current collector 60 at a lower portion (−z direction). As such, the knurling 63 of the second auxiliary current collector 60 can be welded to the can 72 by using a resistor, and thus, the second current collector 30 can be electrically connected to a bottom surface of the can 72. For example, since only the knurling 63 of the second auxiliary current collector 60 (not an entire bottom surface of the second auxiliary current collector 60) contacts the can 72, a contact area between the second auxiliary current collector 60 and the can 72 is reduced. In this example, the welding therebetween is performed by efficiently using heat emitted by the resistor. In this example, a bottom surface of the knurling 63 (in −z direction) has wrinkles, and thus, the welding effect due to the resistor heat is improved.

Figure 6:
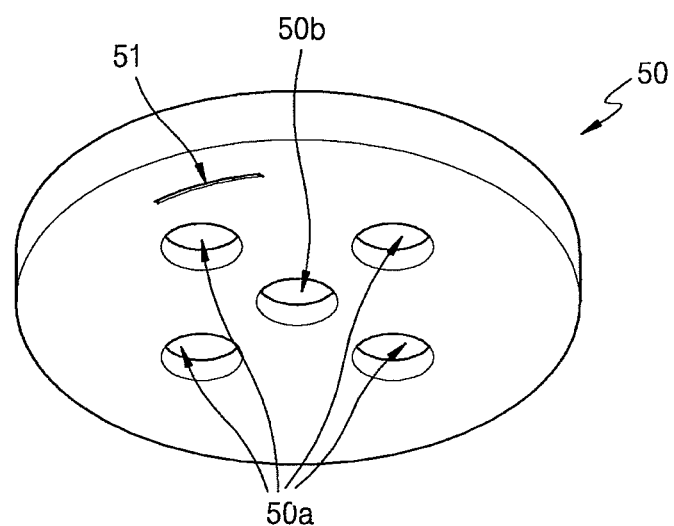
FIG. 6 is a bottom perspective view of a first auxiliary current collector of a secondary battery according to an embodiment.

In addition, as shown in FIG. 6, in order to insert the welding rod in the winding hole 40a, the first auxiliary current collector 50 has a central through hole 50b corresponding to the winding hole 40a. The first auxiliary current collector 50 can include a plurality of first injection through holes 50a. After placing the electrode assembly in the can 72, an electrolyte is injected in the can 72, and due to the first injection through holes 50a, the electrolyte can be sufficiently located at least between the first and second current collectors 10 and 30. As shown in FIG. 7, the second auxiliary current collector 60 also has a plurality of second injection through holes 60a. Therefore, the electrolyte located between the electrode assembly and the can 72 can move upward (in +z direction) through the lower portion of the second auxiliary current collector 60 and through the second injection holes 60a so that the electrolyte can be sufficiently located at least between the first and second current collector 10 and 30.

In addition, the first auxiliary current collector 50 includes an electrode terminal 53 located on an upper surface (in +z direction) as shown in FIG. 4, and the first coating layer substantially covers the first auxiliary current collector 50 except for the electrode terminal 53. The electrode terminal 53 is located in the first auxiliary current collector 50 in a direction (+z direction) substantially opposite to the direction toward the electrode assembly (−z direction). Accordingly, as shown in FIG. 8, when a can lid 74 is coupled to the can 72 when the electrode assembly is inserted in the can 72, the electrode terminal 53 contacts the can 72 so that the first current collector 10 can be electrically connected to the can lid 74. An electric insulating layer can be located between the can 72 and the can lid 74.

Figure 9:
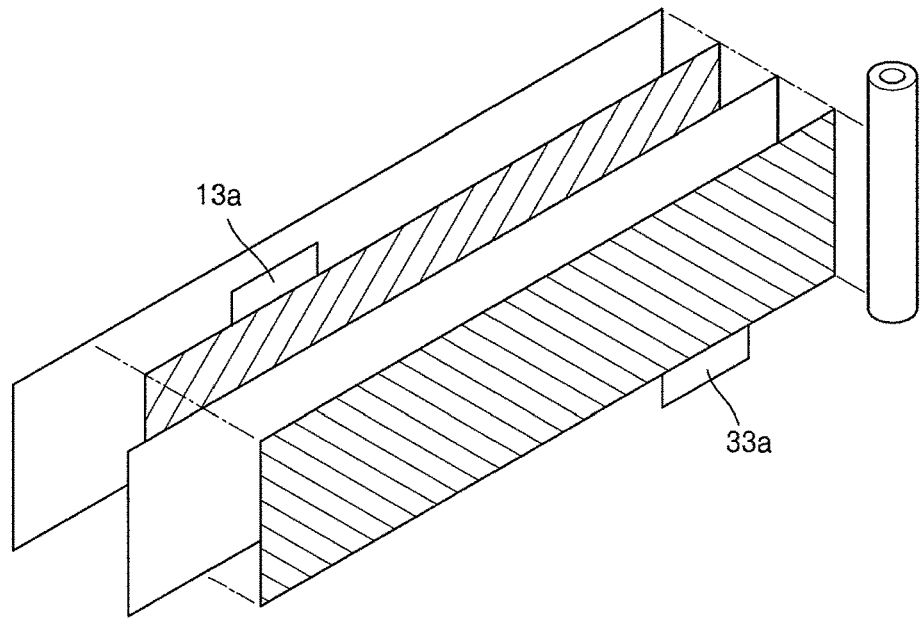
FIG. 9 is a schematic perspective view illustrating processes of manufacturing a secondary battery according to another embodiment.

FIG. 9 is a schematic perspective view illustrating processes of manufacturing a secondary battery according to another embodiment. As shown in FIG. 9, the first part 13a and the second part 33a are located at different locations from those shown in FIG. 1. For example, in FIG. 1, the first part 13a is located in the second direction (+z direction) at the end in the opposite direction (−x direction) on a side edge of the first electrode plate 13 (in +z direction). However, as shown in FIG. 9, the first part 13a is not located at the end in the opposite direction (−x direction), but is located at a substantially center portion on the first electrode plate 13. The second part 33a is not located at the end in the opposite direction (−x direction), but can be located in the first direction (+x direction) based at least in part on a substantially center portion of the second electrode plate 33 as shown in FIG. 9.

Figure 10:
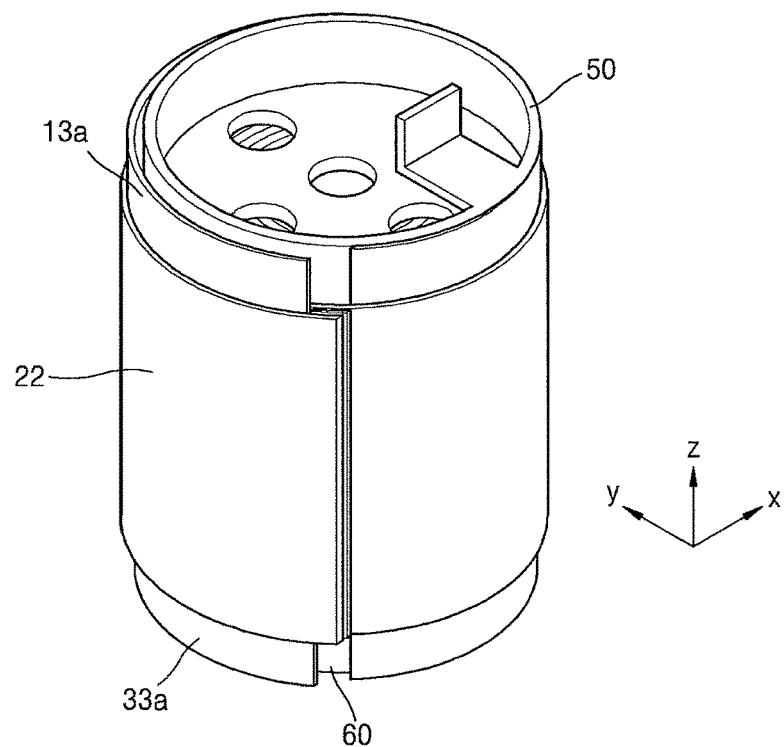
FIG. 10 is a schematic illustrating a secondary battery according to another embodiment.

In the above description, the first part 13a is inserted in the first through-hole 51 and. the second part 33a is inserted in the second through-hole 61 so that the first and second auxiliary current collectors 50 and 60 are electrically connected to the electrode assembly. However, the described technology is not limited thereto. For example, as shown in FIG. 10, the first part 13a contacts an outer surface of the first auxiliary current collector 50 so as to be electrically connected to the first auxiliary current collector 50. Furthermore, the second part 33a contacts an outer surface of the second auxiliary current collector 60 so as to be electrically connected to the first auxiliary current collector 50. In this case, the first part 13a can be welded on the outer surface of the first auxiliary current collector 50 and the second part 33a can be welded on the outer surface of the second auxiliary current collector 60 by using laser, if necessary.

The method of manufacturing the secondary battery has been described above. However, the described technology is not limited thereto. For example, the secondary battery according to one or more embodiments includes the electrode assembly shown in FIG. 4, the first auxiliary current collector 50, and the second auxiliary current collector 60.

The electrode assembly can have a structure in which the first and second current collectors 10 and 30 are alternately wound with the isolation layers 21 and 22 interposed therebetween. In some embodiments, the first part 13a protrudes or extends upward (+z direction) and the second part 33a protrudes or extends downward (−z direction).

In some embodiments, the first part 13a does not correspond to the circumference of the electrode assembly as shown in FIG. 4. However, as shown in FIG. 5, the size of the first part 13a is adjusted so that the first part 13a corresponds to the entire or substantially the entire circumference of the electrode assembly. The size of the second part 33a is adjusted so that the second part 33a corresponds to the entire or substantially the entire circumference of the entire electrode assembly, as shown in FIG. 5. As such, a contact area between the first part 13a and the first auxiliary current collector 50 and a contact area between the second part 33a and the second auxiliary current collector 60 can increase, and thus, the performance of the secondary battery can be improved.

The first current collector 10 can have the first electrode plate 13 protruding in the second direction (+z direction). One or opposite surfaces of the first electrode plate 13 can be coated with the first active material 11 (see FIGS. 1 and 3). In some embodiments, the first active material 11 is not formed on the first part 13a. If the first current collector 10 is a cathode current collector, the first electrode plate 13 can be formed of aluminum. In this case, the first active material 11 is a cathode active material that includes, for example, lithium-based oxide material.

The second current collector 30 can include the second electrode plate 33 protruding in the −z direction that is substantially opposite to the second direction (+z direction). One or opposite surfaces of the second electrode plate 33 can be coated with the second active material 31 (see FIGS. 2 and 3). In some embodiments, the second active material 31 is not formed on the second part 33a. If the second current collector 30 is an anode current collector, the second electrode plate 33 can be formed of copper. In this case, the second active material 31 is an anode active material that includes, for example, a carbon material.

The first auxiliary current collector 50 is formed on an upper portion of the electrode assembly (in the +z direction), and includes the first through-hole 51 (see FIG. 6) in which the first part 13a is inserted so as to be electrically connected to the first current collector 10. The second auxiliary current collector 60 is located on a lower portion of the electrode assembly (in the −z direction), and includes the second through-hole 61 (see FIGS. 4 and 7) in which the second part 33a so as to be electrically connected to the second current collector 30. Thus, the first auxiliary current collector 50 is electrically connected to the first current collector 10, and the second auxiliary current collector 60 is electrically connected to the second current collector 30. In some embodiments, the first part 13a and the first auxiliary current collector 50 are welded to each other by laser in a state where the first part 13a is inserted in the first through-hole 51. In some embodiments, the second part 33a and the second auxiliary current collector 60 are welded to each other by laser in a state where the second part 33a is inserted in the second through-hole 61.

As described above, the first part 13a is inserted in the first through-hole 51 and the second part 33a is inserted in the second through-hole 61, and thus, an electric connection between the first current collector 10 and the first auxiliary current collector 50 and between the second current collector 30 and the second auxiliary current collector 60 can be substantially ensured.

The first through-hole 51 can penetrate through the first auxiliary current collector 50. The second through-hole 61 can penetrate through the second auxiliary current collector 60.

In addition, the bottom surface of the first auxiliary current collector 50 in at least a direction toward the electrode assembly can be coated with a first coating layer that is a first insulating layer. Since the first insulating layer is formed between the first auxiliary current collector 50 and the electrode assembly, only the first part 13 can be electrically connected to the first auxiliary current collector 50. Consequently, in some embodiments, only the first auxiliary current collector 50 and the first current collector 10 are electrically connected to each other, and the first auxiliary current collector 50 and the second current collector 30 are not electrically connected to each other. The first coating layer, that is, the insulating layer, can also be formed on side surfaces of the first auxiliary current collector 50 so as to prevent a short-circuit between the first auxiliary current collector 50 and the can 72 (see FIG. 8).

An upper surface of the second auxiliary current collector 60 in at least a direction toward the electrode assembly can be substantially covered with a second coating layer, that is, a second insulating layer. Since the second insulating layer is formed between the second auxiliary current collector 60 and the electrode assembly, only the second part 33a, which is inserted in the second through-hole 61, is electrically connected to the second auxiliary current collector 60. Consequently, in some embodiments, only the second auxiliary current collector 60 and the second current collector 30 are electrically connected to each other, and the second auxiliary current collector 60 and the first current collector 10 are not electrically connected to each other.

In some embodiments, the electrode assembly includes the winding hole 40a extending in a substantially vertical direction (in the z-axis), and the first auxiliary current collector 50 includes a central through hole 50b (see FIGS. 4 and 6) corresponding to the winding hole 40a. As shown in FIG. 8, the secondary battery includes the can 72 having an open upper portion (in +z direction). In some embodiments, the first auxiliary current collector 50, the electrode assembly, and the second auxiliary current collector 60 are inserted in the can 72. Accordingly, when manufacturing the secondary battery, a welding rod can be inserted into the central through hole 50b and the winding hole 40a so that the end of the welding rod can contact the second auxiliary current collector 60 located on a lower portion (−z direction). As such, the second auxiliary current collector 60 and the can 72 can be welded to each other by a resistor so that the second current collector 30 can be electrically connected to the bottom surface of the can 72.

For example, the second auxiliary current collector 60 has the knurling 63 corresponding to the winding hole 40a on a surface opposite (−z direction) to the direction toward the electrode assembly (+z direction). In this example, since the entire bottom surface of the second auxiliary current collector 60 does not contact the can 72 and only the knurling 63 contacts the can 72, the contact area between the second auxiliary current collector 60 and the can 72 is reduced, and accordingly, the welding using the resistor can be performed efficiently. For example, as the knurling 63 has a bottom surface (in −z direction) with wrinkles, the welding efficiency is improved further.

In addition, the first auxiliary current collector 50 can include a plurality of first injection through holes 50a in addition to the central through hole 50b. Thus, after locating the electrode assembly, etc. in the can 72, an electrolyte is injected in the can 72, and the electrolyte can be sufficiently located at least between the first and second current collectors 10 and 30. As shown in FIG. 7, the second auxiliary current collector 60 also includes a plurality of second injection through holes 60a. Thus, when injecting the electrolyte in the can 72, the electrolyte located between the electrode assembly and the can 72 can move upward (+z direction) through the lower portion of the second auxiliary current collector 60 and the second injection through holes 60a. Thus, in some embodiments, the electrolyte can be sufficiently located at least between the first and second current collectors 10 and 30.

The first auxiliary current collector 50 includes the electrode terminal 53 located on a surface of the upper portion (in the +z direction) as shown in FIG. 4. In some embodiments, the first coating layer, that is, the first insulating layer, substantially covers the first auxiliary current collector 50 except for the electrode terminal 53. The electrode terminal 53 is located in the first auxiliary current collector 50 in an opposite direction (+z direction) to the direction facing the electrode assembly (−z direction). Accordingly, as shown in FIG. 8, when the can lid 74 is coupled to the can 72 in a state where the electrode assembly is inserted in the can 72, the electrode terminal 53 contacts the can 72 so that the first current collector 10 is electrically connected to the can lid 74. An electric insulating layer can be located between the can 72 and the can lid 74.

As presented above, the first part 13a is inserted into the first through-hole 51 and the second part 33a is inserted into the second through-hole 61 so that the first and second auxiliary current collectors 50 and 60 are electrically connected to the electrode assembly. However, the described technology is not limited thereto. For example, as shown in FIG. 10, the first part 13a contacts an outer surface of the first auxiliary current collector 50 so as to be electrically connected to the first auxiliary current collector 50, and the second part 33a contacts an outer surface of the second auxiliary current collector 60 so as to be electrically connected to the first auxiliary current collector 50. In this case, the first part 13a can be welded on the outer surface of the first auxiliary current collector 50 and the second part 33a can be welded on the outer surface of the second auxiliary current collector 60 by using laser, if necessary.

Figure 11:
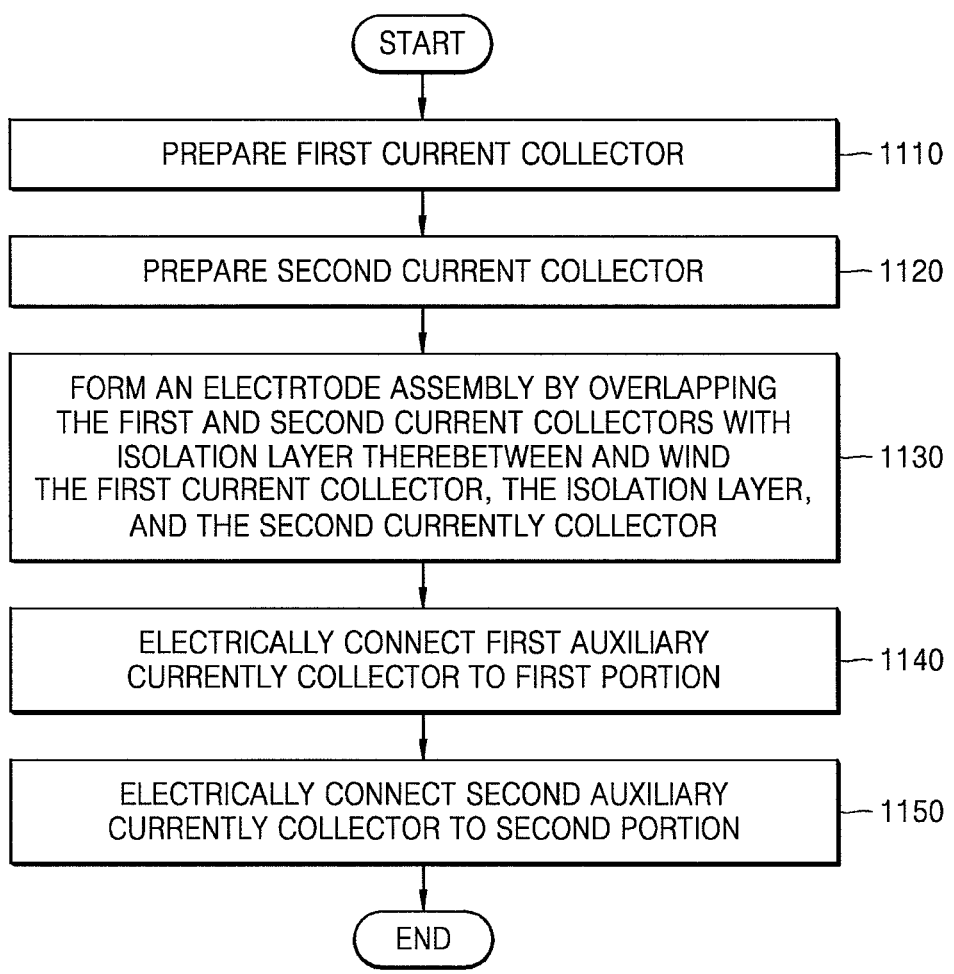
FIG. 11 is a flowchart showing an exemplary operation of manufacturing a secondary battery according to an embodiment.

FIG. 11 is a flowchart showing an exemplary operation or procedure 1100 of manufacturing a secondary battery according to an embodiment. Depending on the embodiment, additional states may be added, others removed, or the order of the states changed in FIG. 11. In state 1110, a first current collector extending in a first direction is prepared and includes a first portion protruding in a second direction crossing the first direction. In state 1120, a second current collector extending in the first direction is prepared and includes a second portion protruding in a direction opposite to the second direction. In state 1130, the first and second current collectors are overlapped with an isolation layer interposed therebetween, and the first current collector, the isolation layer, and the second current collector are wound around an axis in the second direction to form an electrode assembly. In state 1140, a first auxiliary current collector is electrically connected to the first portion so as to electrically connect the electrode assembly to the first auxiliary current collector in the second direction. In state 1150, a second auxiliary current collector is electrically connected to the second portion so as to electrically connect the electrode assembly and the second auxiliary current collector to each other in a direction opposite to the second direction.

As described above, according to at least one of the disclosed embodiments, a secondary battery can be easily manufactured with high production yield.

It should be understood that the exemplary embodiments described therein should be considered in a descriptive sense only and not for purposes of limitation. Descriptions of features or aspects within each embodiment should typically be considered as available for other similar features or aspects in other embodiments.

While the inventive technology has been described with reference to the figures, it will be understood by those of ordinary skill in the art that various changes in form and details can be made therein without departing from the spirit and scope of the present invention as defined by the following claims.

What is claimed is:

1. A secondary battery comprising:
   an electrode assembly including a first current collector, a second current collector, and an isolation layer interposed between the first and second current collectors, wherein the first current collector, the second current collector, and the isolation layer are wound, wherein each of the first and second current collectors includes a body portion and an extension portion extending from the body portion, wherein the extension portions of the first and second current collectors extend in opposite directions;
   a first auxiliary current collector formed over the electrode assembly and electrically connected to the extension portion of the first current collector; and
   a second auxiliary current collector formed below the electrode assembly and electrically connected to the extension portion of the second current collector;
   wherein the first auxiliary current collector has a first through-hole and the extension portion of the first current collector is inserted into and passes through the first through-hole, wherein the second auxiliary current collector has a second through-hole and the extension portion of the second current collector is inserted into and passes through the second through-hole, and wherein a majority of the extension portion of each of the first and second current collectors passes through a corresponding one of the first and second through-holes.

2. The secondary battery of claim 1, further comprising:
   a first insulating layer formed between a surface of the first auxiliary current collector which faces the electrode assembly and the electrode assembly; and
   a second insulating layer formed between a surface of the second auxiliary current collector which faces the electrode assembly and the electrode assembly.

3. The secondary battery of claim 2, wherein the first insulating layer includes a first coating layer covering the surface of the first auxiliary current collector.

4. The secondary battery of claim 3, wherein the first auxiliary current collector comprises an electrode terminal formed on a surface that faces a direction opposite to the electrode assembly, and wherein the first coating layer covers the first auxiliary current collector except for at least the electrode terminal.

5. The secondary battery of claim 2, wherein the second insulating layer includes a second coating layer covering the surface of the second auxiliary current collector facing the electrode assembly.

6. The secondary battery of claim 1, wherein the electrode assembly has a winding hole extending in a vertical direction in a center portion thereof, and wherein the first auxiliary current collector comprises a central through hole corresponding to the winding hole.

7. The secondary battery of claim 6, wherein the second auxiliary current collector includes a knurling corresponding to the winding hole, on a surface that faces a direction opposite to the electrode assembly.

8. The secondary battery of claim 1, wherein the first auxiliary current collector has a plurality of first injection through holes.

9. The secondary battery of claim 8, wherein the second auxiliary current collector has a plurality of second injection through holes.

10. The secondary battery of claim 1, further comprising:
a first active material layer formed on the body portion of the first current collector; and
a second active material layer formed on the body portion of the second current collector.

11. The secondary battery of claim 1, wherein at least one of the first and second through-holes is curved in a winding direction of the electrode assembly.

12. The secondary battery of claim 1, wherein at least one of the extension portions of the first and second current collectors is curved in a winding direction of the electrode assembly.

13. The secondary battery of claim 1, wherein the extension portions of the first and second current collectors are formed only in an outermost surface of the electrode assembly.

\* \* \* \* \*